(12) United States Patent
Barker

(10) Patent No.: US 6,702,510 B2
(45) Date of Patent: Mar. 9, 2004

(54) UTILITY SIDEWALK

(75) Inventor: James E. Barker, Branson, MO (US)

(73) Assignee: EDE Holdings, Inc., Joplin, MO (US)

(*) Notice: Subject to any disclaimer, the term of this patent is extended or adjusted under 35 U.S.C. 154(b) by 0 days.

(21) Appl. No.: 10/038,721

(22) Filed: Jan. 3, 2002

(65) Prior Publication Data

US 2003/0123929 A1 Jul. 3, 2003

(51) Int. Cl.[7] .............................. E04B 5/48; E01C 11/22
(52) U.S. Cl. ..................... 404/3; 52/220.5; 52/220.3; 52/220.2
(58) Field of Search ................ 404/2, 3, 4, 5; 52/220.1, 220.2, 220.3, 220.4, 220.7, 220.8, 220.5; 138/105, 108, 110

(56) References Cited

U.S. PATENT DOCUMENTS

| | | | | |
|---|---|---|---|---|
| 355,330 A | * | 1/1887 | Locke ............................ 404/3 |
| 896,984 A | | 8/1908 | Freeman | |
| 1,582,557 A | * | 4/1926 | Swanto et al. | |
| 2,445,197 A | * | 7/1948 | Wiesmann .................. 52/220.4 |
| 2,862,367 A | | 12/1958 | Silverstein et al. | |
| 3,503,425 A | | 3/1970 | Holm .......................... 138/108 |
| 3,715,844 A | * | 2/1973 | Breading .................... 52/220.5 |
| 3,815,304 A | | 6/1974 | Schille et al. ................. 52/100 |
| 3,858,614 A | | 1/1975 | Moore et al. ................ 138/105 |
| 4,124,324 A | | 11/1978 | Augis et al. ..................... 404/3 |
| 5,123,776 A | * | 6/1992 | Lang et al. ..................... 404/25 |
| 5,267,367 A | * | 12/1993 | Wegmann, Jr. .............. 14/69.5 |
| 5,522,675 A | * | 6/1996 | Gunter ........................ 405/118 |
| 5,538,361 A | * | 7/1996 | Beamer ....................... 405/118 |
| 5,573,351 A | * | 11/1996 | Beamer ....................... 405/119 |
| 5,653,553 A | * | 8/1997 | Gunter .......................... 405/36 |
| 5,810,513 A | * | 9/1998 | Beamer et al. ............. 405/119 |
| 6,128,872 A | | 10/2000 | Marshall et al. ........... 52/220.1 |

* cited by examiner

*Primary Examiner*—Thomas B. Will
*Assistant Examiner*—Alexandra Pechhold
(74) *Attorney, Agent, or Firm*—Wood, Herron & Evans, LLP

(57) ABSTRACT

A utility trenching and sidewalk system comprising modular utility sidewalk units which may be assembled together to form a cable trench. The modular units are formed from plastic composite material and include sidewalls, a bottom wall and covers which define a chamber for housing utility cables. The covers are removable from the module to provide access to the chamber. The module further includes a recess for receiving a paving material which serves as a sidewalk surface in the installed system.

11 Claims, 3 Drawing Sheets

UTILITY SIDEWALK

FIELD OF THE INVENTION

The present invention pertains to utility trenches for routing utility cables.

BACKGROUND OF THE INVENTION

Utility cables are often buried beneath the earth to hide the cables and to protect them from damage, especially in residential or business areas. Buried utility cables, however, suffer many drawbacks. For example, various utility providers (such as electric, telephone and television providers) often work independently and bury their respective cables in separate locations. Such non-uniform burying of cables may lead to confusion regarding utility company rights of way and creates the danger of cables being severed or damaged during excavation by homeowners, developers, or other utility providers. If the cables are severed or otherwise damaged, repair or replacement requires the costly and time-consuming process of digging up of the buried cables. Furthermore, cables which are buried in the earth must be manufactured with relatively expensive insulation to protect the cables against moisture, heat, and damage from rodents.

To address some of the problems associated with exposed, buried cables, cable trenching systems have been developed to enclose the buried cables in a conduit. Previous trenching systems have typically been made from precast sections of concrete and are thus very heavy and costly compared to other available structural materials. Some trenching systems have been designed to function additionally as sidewalk sections to take advantage of their concrete structure. These precast concrete systems are installed into excavated trenches where nonuniform footing makes them susceptible to poor fit at the joints, which in turn may lead to rocking or shifting of the sidewalk sections.

Many of the previous trenching systems are designed to have only a single compartment for accommodating cables. As such, these prior art systems are not designed to handle incompatible cables which should be kept separate, such as electric cables and telephone or television cables. These incompatible cables must be kept separate due to the high voltage carried by electric cables which may interfere with the telephone or television cables, or create a hazardous environment for telephone or television utility employees who must access the trenching system.

For at least these reasons, there is a need for an improved utility trenching system for routing and protecting incompatible utility cables within a single unitary structure which is relatively lightweight and inexpensive compared to prior cable trenching systems.

SUMMARY OF THE INVENTION

The present invention provides a utility cable trenching system that separates incompatible utility cables while also providing a stable sidewalk surface. The utility trenching and sidewalk system of the present invention comprises modular units formed from relatively lightweight plastic composite material. Each module has outer sidewalls, a bottom wall, and at least one removable cover, which together form a channel. Advantageously, each module includes an inner sidewall for providing two interior compartments for separating incompatible cables. The modular units are fastened together in an excavated trench to form a continuous conduit in which the various cables may be laid, with incompatible cables located in separate compartments. The cables may be routed in and out of the compartments through ports in the sidewalls at various locations along the assembled utility trench.

The assembled modules are configured to provide a recess that serves as a form for receiving a paving material to create a sidewalk surface. The paving material, for example, may be precast pavers or mixed concrete which is poured into the recess and cured in situ. Lifting hooks positioned at various locations on the paving material aid in removing the paving material so that the cable compartments may be accessed.

In accordance with the present invention, a method for installing a utility trenching and sidewalk system, includes the steps of excavating a trench, placing modular utility sidewalk units adjacent one another in the trench to form a substantially continuous conduit, fastening adjacent modules togther, laying utility cable in the conduit, installing covers to the modules, and pouring concrete into a form created by the series of adjacent modules to form a sidewalk.

These and other features, advantages, and objectives of the invention will become more readily apparent to those of ordinary skill in the art upon review of the following detailed description of the preferred embodiments, taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
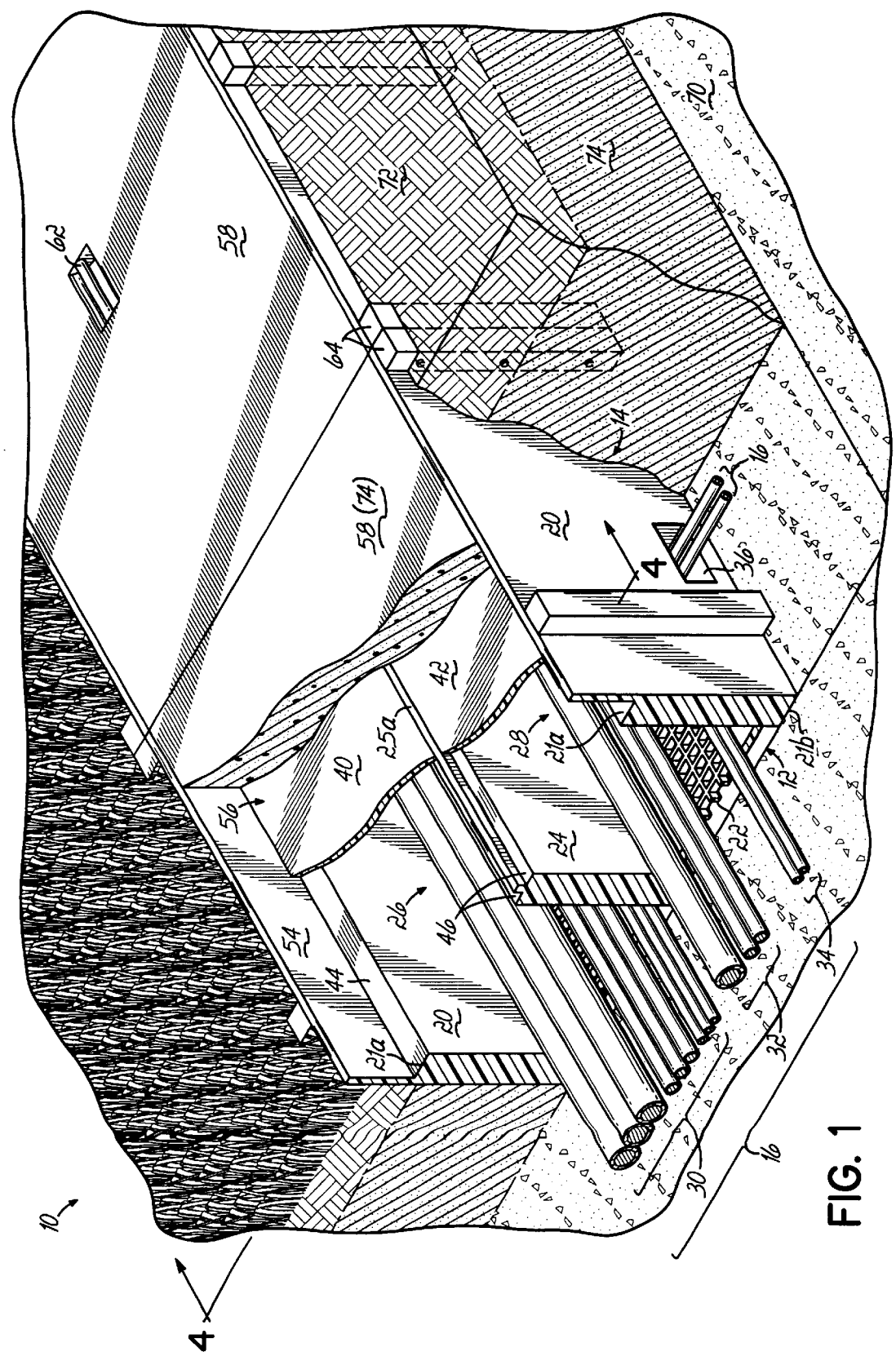
FIG. 1 is a perspective view of an exemplary utility trenching and sidewalk system of the present invention installed in a compacted earth environment.
Figure 2:
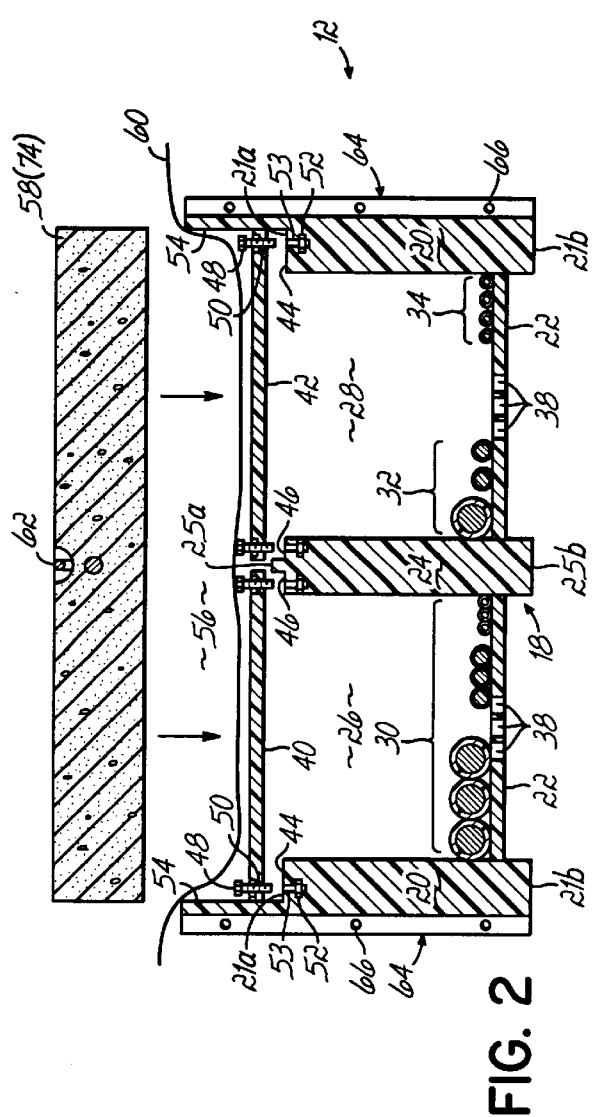
FIG. 2 is an exploded cross-sectional view of an exemplary utility trenching and sidewalk module of the present invention.

An exemplary utility trenching and sidewalk system 10 of the present invention is shown in FIGS. 1–5 in which like numerals are used to refer to like components. The trenching system 10 comprises a series of modular units 12 placed in an excavated trench 14 adjacent one another, longitudinally end to end, in an abutting relationship to form a continuous conduit for routing and protecting utility cables 16 laid within the conduit. Referring particularly to FIG. 2, the module 12 comprises a channel section 18 formed by opposing, and advantageously substantially parallel, outer sidewalls 20 and a bottom wall 22. Each outer sidewall has a top edge 21a and a bottom edge 21b, and the bottom wall 22 may be disposed proximate the bottom edges 21b. An inner sidewall 24 having a top edge 25a and a bottom edge 25b may be situated between the outer sidewalls 20, advantageously parallel thereto, with the bottom edge 25b proximate bottom wall 22. The inner sidewall 24 divides the channel 18 into two distinct compartments 26, 28. The channel 18 may thus be used to house utility cables 16 (30, 32, 34) from several providers, with incompatible cables located in individual compartments and separated by the inner side wall 24. For example, electrical power cables 30 may be located in the first compartment 26 and separated from other utility cables, such as telephone and television cables 32, 34, which may be located in the second compartment 28.

While the exemplary embodiments shown have two compartments 26, 28, the utility trenching system and sidewalk system 10 of the present invention may have more than two compartments, as may be required for a given application. Alternatively, the utility trenching and sidewalk system 10 of the present invention may have only a single compartment for housing cables, such as when there is no need to separate incompatible cables. Where a single compartment is desired, inner sidewall 24 may be eliminated and a single cover provided to enclose the compartment.

As more clearly shown in FIG. 1, the outer sidewalls 20 may be provided with ports 36 at various locations along the module 12 to permit the cables 16 to be routed into or out of the compartments 26, 28, as necessary, for connection to appropriate intermediate or end use systems. Drain holes 38 may be located in the bottom wall 22, to allow water or other liquids to pass through the bottom wall 22 and out of the compartments 26, 28.

Figure 4:
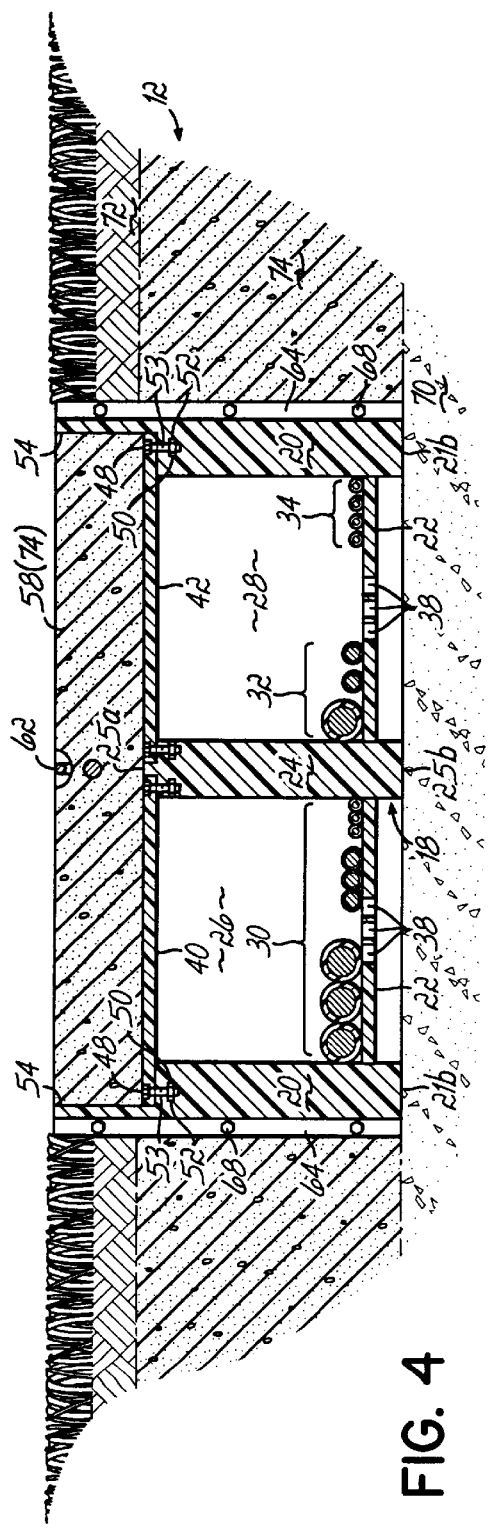
FIG. 4 is a cross-sectional view of the trenching and sidewalk system of FIG. 1, taken along line 4—4.
Figure 5:
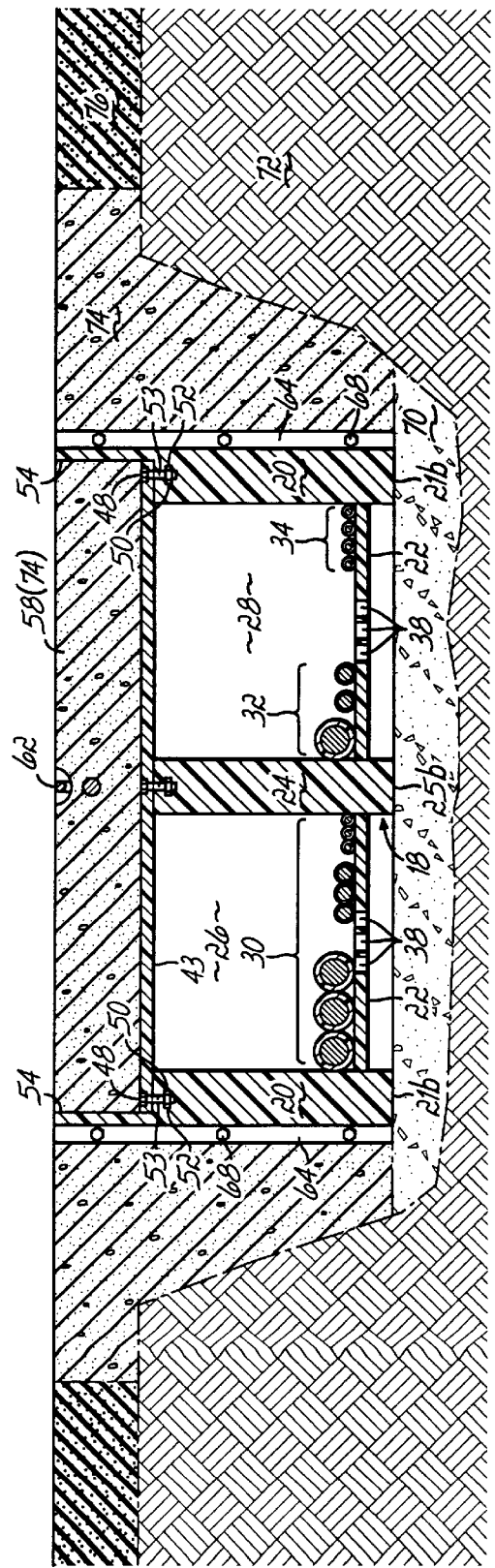
FIG. 5 is a cross-sectional view of an alternate embodiment of a utility trenching and sidewalk system of the present invention installed in an asphalt pavement environment.

The module 12 includes covers 40, 42 which may be fitted over the outer and inner sidewalls 20, 24 to enclose the cables 16 within the compartments 26, 28. In the exemplary embodiment shown in FIGS. 1–4, the module 12 includes two covers 40, 42, one for each respective compartment 26, 28 of the channel 18. In the alternative embodiment shown in FIG. 5, a single cover 43 is provided over channel 18. However, while the module 12 may be constructed with only a single cover 43, having separate covers 40, 42 is advantageous in that it permits utility providers to access their respective cables 16 without disturbing or otherwise being exposed to incompatible cables of another utility provider. This is particularly advantageous in protecting against electric shock from power cables 30. The top edge 21a and 25a of the outer and inner sidewalls 20, 24, respectively, have ledge portions 44, 46, respectively, which support the covers 40, 42. By way of example, the covers 40, 42 may be fastened to the ledge portions 44, 46 of the inner and outer sidewalls 20, 24 using bolts 48 installed through bolt holes 50 in the covers and received into threaded portions 52 of the inner and outer sidewalls 20, 24. Threaded portions 52 of the inner and outer sidewalls 20, 24 may be provided, for example, by self-centering, stainless steels nuts or threaded inserts installed into recesses 53 located in the ledge portions 44, 46 of the inner and outer sidewalls 20, 24. As shown in FIG. 5, ledge portions 46 need not be formed in top edge 25a on inner sidewall 24 when a single cover is used, and a single bolt 48 into sidewall 24 may be used to fasten the cover to it. Though not shown, it may be appreciated that inner sidewall 24 and bolt 48 may be eliminated if only a single compartment is desired. Likewise, more than two covers and more than one inner sidewall may be provided to create and enclose more than two compartments.

The top edges 21a of outer sidewalls 20 of the module 12 have a raised portion 54 along an outward portion of the top edge 21a of sidewall 20 which extends beyond the top surface of the covers 40, 42. The raised portions 54 of the outer sidewalls 20 define a recess 56 in the module 12, together with the covers 40, 42, which serves as a form for receiving a paving material 58, such as concrete or brick, which can be used as a sidewalk. The paving material 58 may be precast and placed within the recess 56 after the modules 12 have been assembled together, as shown in FIG. 2, or the paving material 58 may be molded in situ directly in the recess 56. For example, concrete may be poured directly into the recess 56 and cured in situ to create a concrete sidewalk. As shown in FIG. 2, a flexible barrier material 60, such as plastic sheeting, may be placed in the recess 56 prior to pouring paving material 58, such as concrete, into the recess 56 to form the sidewalk. The barrier material 60 allows the paving material 58 to cure without bonding to the modular unit 12 so that the hardened paving material 58 may be more easily removed from the recess 56 when access to the interior compartments 26, 28 is required.

In the exemplary embodiment shown, the paving material 58 advantageously includes lifting hooks 62 fixed to the paving material 58 to facilitate lifting the paving material 58 from the modular unit 12 so that the covers 40, 42 may be removed to access the individual compartments 26, 28 which house the cables 16. The lifting hooks 62 may be cast into a precast paver to be placed on the modular unit 12, or they may be embedded into the paving material 58 after it has been poured into the recess 56 formed by the sidewalls 20 and covers 40, 42 as described above.

Figure 3:
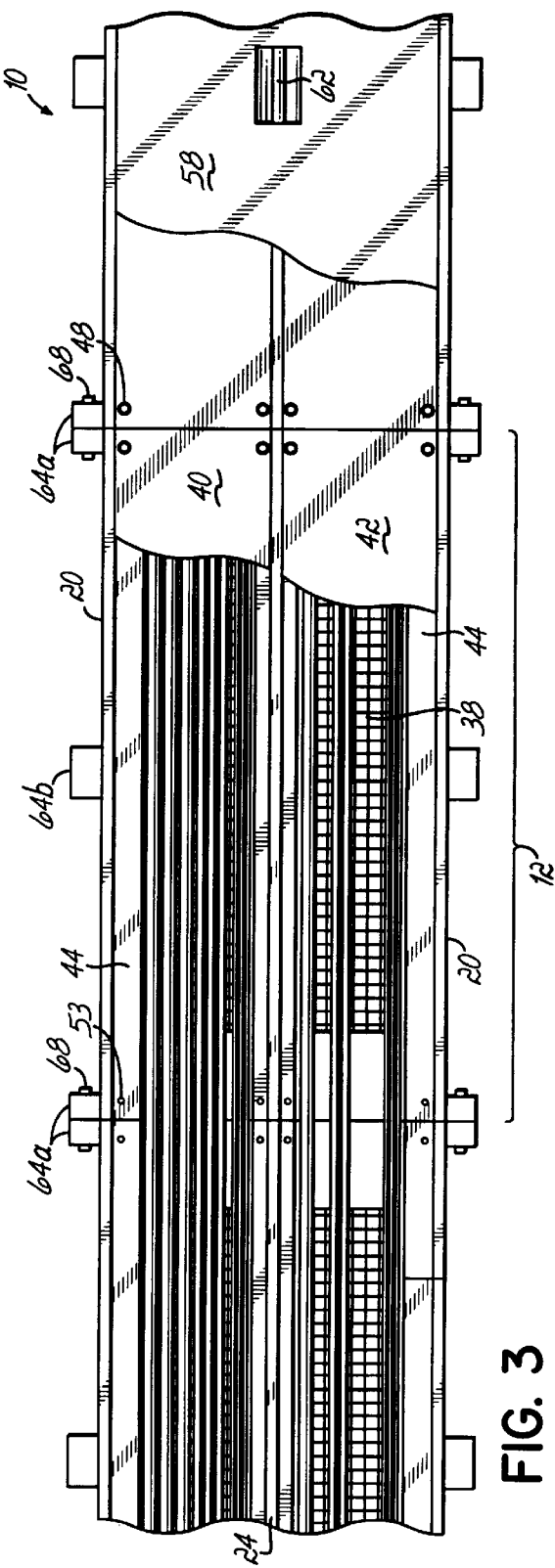
FIG. 3 is a partial plan view of the utility trenching and sidewalk system of FIG. 2.

The modular units 12 may further include side braces 64 positioned at various locations along the outer sidewalls 20. In the exemplary embodiment shown, some of the side braces 64a, as shown in FIG. 3, are located at end portions of a module 12 and have holes 66, as seen in FIGS. 2, 4 and 5, through which adjacent modules 12 may be fastened together with bolts 68. When the modules 12 are bolted together in such a fashion and concrete is poured into the recess 56 formed by the outer sidewalls 20 and covers 40, 42, the resulting trenching and sidewalk system 10 provides a uniform sidewalk with perfectly fitted sidewalk sections which do not shift or rock. Other side braces 64b may be positioned intermediate the ends of a module 12 to support the structure.

While concrete or other paving material 58 is used to create a sidewalk surface, the modular unit 12 itself is advantageously formed from a polymeric composite material. The module 12 may be formed by molding, casting, extruding, or other suitable manufacturing methods. The resulting module 12 is a lightweight structure which can be easily transported, maneuvered, and assembled into a utility trenching and sidewalk system 10 by an individual. The lightweight nature of the modular units 12 of the present invention thus offers a distinct advantage over the heavy precast concrete structures previously used.

A utility trenching and sidewalk system 10 according to the principles of the present invention may be installed in a variety of environments to provide an effective cable trenching system integral with a sidewalk. A typical installation in a compacted earth environment is shown in FIGS. 1 and 4. An alternative installation in an asphalt pavement environment is depicted in FIG. 5. Referring to these figures and FIG. 3, a method for installing a utility trenching and sidewalk system 10 according to the present invention will be described. To form the utility trench, several modules 12 are laid longitudinally end to end in a trench 14 which has been excavated in a desired location and lined with an appropriate base material, such as gravel 70. Adjacent modules 12 are bolted together at abutting side braces 64a to create a utility trench, as depicted in FIG. 3. Cables 16 of various utility providers, such as electric cables 30, telephone cables 32, and television cables 34, may then be laid within appropriate compartments 26, 28 of the series of modules 12.

Once the cables 16 have been laid, the module covers 40, 42 may then be installed and bolted in place with bolts 48. The excavated trench 14 may then be backfilled with earth 72, concrete 74, asphalt 76, or other appropriate material, as shown in FIGS. 4 and 5. Paving material 58 may be poured into the form created by the recess 56 in the modules 12. To make removal of the paving material 58 easier, a flexible barrier 60 and expansion-joint spacers (not shown) may be placed in the recess 56 prior to filling the recess 56 with paving material 58. Lifting hooks 62 may be placed in the uncured paving material 58 to further aid in the removal of paving material 58 when access to the compartments 26, 28 is desired. Alternatively, precast pavers may be placed into the recess 56 to form the sidewalk surface. The precast pavers may be provided with cast-in lifting hooks 62 to facilitate raising the pavers for access to the compartments 26, 28.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. For example, while an exemplary embodiment has been described having two compartments 26, 28, the modular units of the present invention may have a single compartment or may comprise more than two compartments for separating various types of cables. The multiple compartments may each have a respective cover, or a single cover may be used to enclose the compartments. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A module for a utility trenching and sidewalk system, comprising:

two opposed outer sidewalls, each outer sidewall having a top edge and a bottom edge;

a bottom wall disposed proximate said bottom edges of said outer sidewalls, and together with said sidewalls defining a channel having at least one interior compartment;

at least one cover configured to be removably received proximate said top edges of said outer sidewalls to enclose said channel, wherein said cover and outer sidewalls define a recess above said cover for receiving paving material; and at least one aperature in at least one of said outer sidewalls, said aperature sized to permit the ingress and egress of cabling to and from said interior compartment.

2. A utility trenching and sidewalk system comprising:

a plurality of modular units arranged adjacent one another longitudinally end to end to form a substantially continuous conduit, each modular unit including:

at least two opposed outer sidewalls, each outer sidewall having a top edge and a bottom edge;

at least one inner sidewall disposed between said outer sidewalls and having a top edge and a bottom edge;

a bottom wall disposed proximate said bottom edges of said outer and inner sidewalls, and together with said sidewalls defining a channel having at least one interior compartment for receiving utility cables;

at least one cover configured to be removably received proximate said top edges of said outer and inner sidewalls to enclose said channel, wherein said cover and outer sidewalls define a recess above said cover for receiving paving material; and at least one aperature in at least one of said outer sidewalls, said aperature sized to permit the ingress and egress of cabling to and from said interior compartment.

3. A utility sidewalk comprising:

a plurality of modular units arranged adjacent one another longitudinally end to end to form a substantially continuous conduit, each modular unit including:

at least two opposed outer sidewalls, each outer sidewall having a top edge and a bottom edge;

at least one inner sidewall disposed between said outer sidewalls and having a top edge and a bottom edge;

a bottom wall disposed proximate said bottom edges of said outer and inner sidewalls, and together with said sidewalls defining a channel having at least one interior compartment for receiving utility cables;

at least one cover configured to be removably received proximate said top edges of said outer and inner sidewalls to enclose said channel, wherein said cover and outer sidewalls define a recess above said cover for receiving paving material; and paving material disposed within said recess.

4. The utility sidewalk of claim 3 wherein said paving material is concrete.

5. The utility sidewalk of claim 3 further comprising at least one handle fixture fixed to said paving material for lifting said paving material from said recess.

6. The utility sidewalk of claim 3 wherein said bottom wall includes a plurality of aperatures sized to provide drainage of liquid from said interior compartment.

7. The utility sidewalk of claim 3 wherein said cover and sidewalls are configured to be fastened together.

8. The utility sidewalk of claim 7 further comprising at least one bolt fastening said cover to each of said sidewalls.

9. The utility sidewalk of claim 3 further comprising a side brace at each longitudinal end of each modular unit, wherein adjacent modular units are fastened together by bolts through said side braces.

10. The utility sidewalk of claim 3 wherein said inner and outer sidewalls, said bottom wall, and said cover comprise a plastic composite material.

11. The utility sidewalk of claim 3 comprising at least two covers and at least two interior compartments, each cover configured to enclose a respective interior compartment of said channel.

* * * * *